(12) United States Patent
Bennett

(10) Patent No.: US 9,692,883 B2
(45) Date of Patent: Jun. 27, 2017

(54) CONSENSUAL WIRETAP PHONE SYSTEM

(71) Applicant: World Emergency Network—Nevada Ltd., Carson City, NV (US)

(72) Inventor: Christopher Ryan Bennett, St. Petersburg, FL (US)

(73) Assignee: World Emergency Network—Nevada, Ltd., Carson City, NV (US)

( * ) Notice: Subject to any disclaimer, the term of this patent is extended or adjusted under 35 U.S.C. 154(b) by 300 days.

(21) Appl. No.: 14/491,924

(22) Filed: Sep. 19, 2014

(65) Prior Publication Data

US 2016/0352893 A1 Dec. 1, 2016

Related U.S. Application Data

(60) Provisional application No. 61/880,720, filed on Sep. 20, 2013.

(51) Int. Cl.
| | |
|---|---|
| *H04M 3/42* | (2006.01) |
| *H04M 3/22* | (2006.01) |
| *H04L 29/08* | (2006.01) |
| *H04L 29/06* | (2006.01) |
| *H04L 29/12* | (2006.01) |

(52) U.S. Cl.
CPC .......... *H04M 3/2281* (2013.01); *H04L 63/30* (2013.01); *H04L 67/22* (2013.01); *H04M 3/2218* (2013.01); *H04M 3/42008* (2013.01); *H04M 3/42221* (2013.01); *H04L 61/6018* (2013.01)

(58) Field of Classification Search
None
See application file for complete search history.

(56) References Cited

U.S. PATENT DOCUMENTS

| | | | |
|---|---|---|---|
| 6,498,843 B1* | 12/2002 | Cox ........................ | H04L 63/30 379/207.02 |
| 2015/0365520 A1* | 12/2015 | Bennett ............... | H04M 3/2281 455/417 |

* cited by examiner

*Primary Examiner* — Erika Washington
(74) *Attorney, Agent, or Firm* — Fenwick & West LLP

(57) ABSTRACT

To provide flexible capabilities to agencies, an agency service configures a virtual number for wiretapping communications between subjects and an informant. A wiretap module executing on the informant's device registers with the agency service for authorization to utilize a virtual number for wiretapping the informant device. The wiretapping module works in conjunction with the agency service to covertly route communications between the informant device and subject device through the virtual number, which may be monitored by agency personnel and the communications thereon recorded. Through the described wiretapping system, the informant may communicate with subjects in a traditional fashion utilizing the informant device all the while the communications are monitored and recorded with low cost to the agency.

20 Claims, 7 Drawing Sheets

Map Virtual
Number
350

| Mapping Table 360A | | |
|---|---|---|
| Transmitting Number 361A | Virtual Numbers 363A | Call Record |
| 555-111-2222 ↔ | 555-999-8888 ↔ | Yes |
| 555-111-2222 ↔ | 555-999-7777 ↔ | No |

FIG. 3B

Map Virtual
Number
350

| Mapping Table 360B | |
|---|---|
| Virtual Number 363B | Monitoring Numbers 367 |
| 555-999-8888 ↔ | 555-999-6666 |
| 555-999-8888 ↔ | 555-999-5555 |

FIG. 3C

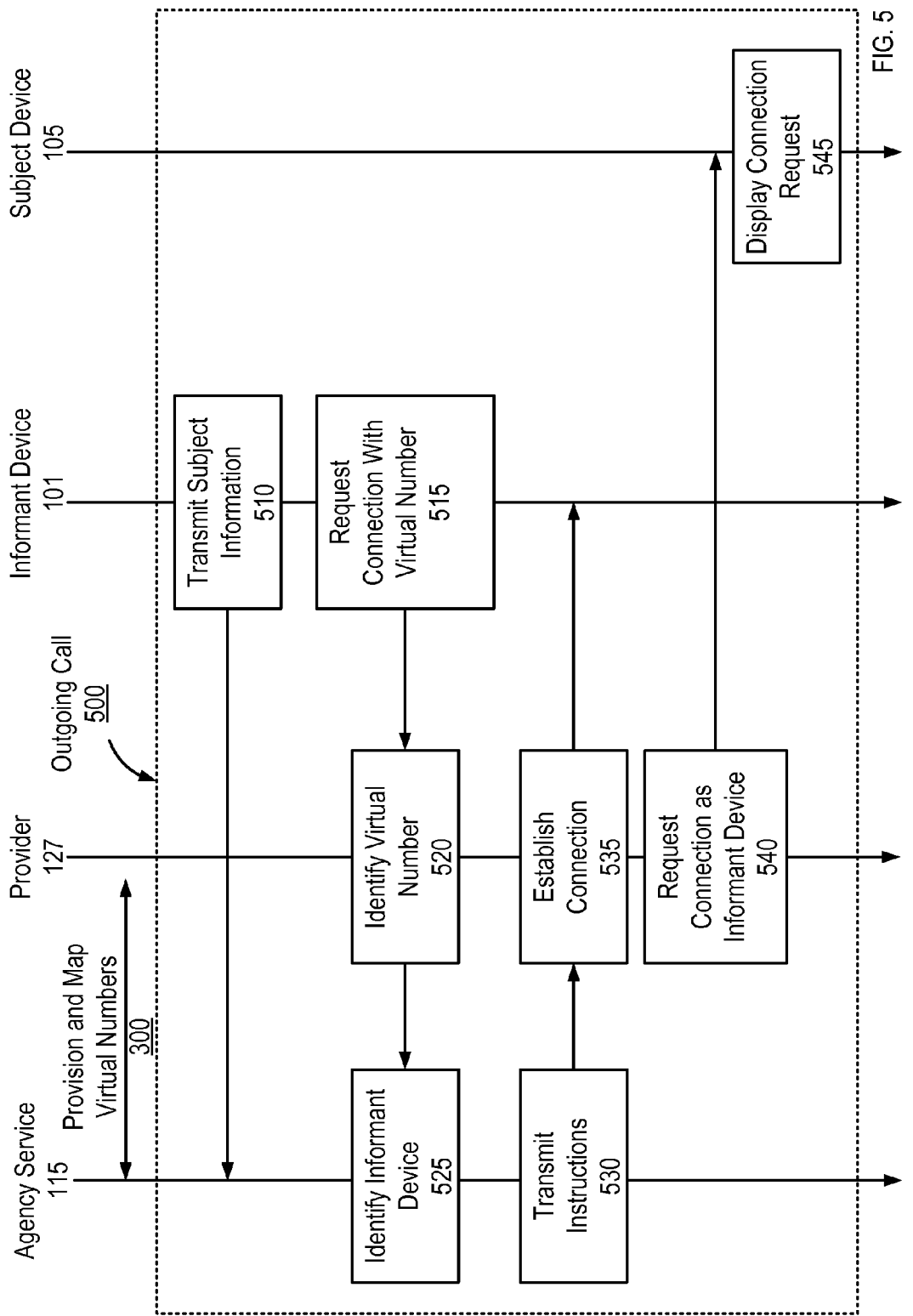

CONSENSUAL WIRETAP PHONE SYSTEM

CROSS REFERENCE TO RELATED APPLICATIONS

This application claims the benefit of U.S. Provisional Application 61/880,720, filed Sep. 20, 2013, which is incorporated by reference herein in its entirety.

BACKGROUND

1. Field of Art

The present disclosure generally relates to the field of undercover operations and more specifically to gathering situational information from an informant.

2. Background of the Invention

Police officers and other agents often use informants to aid in conducting investigations in the field during the course of their duties. For example, an officer conducting an undercover sting in a high-risk situation may rely on an informant to provide key information relative to an objective or other target. A support team may monitor the informant directly in the field and interface with administration at an agency, however, these operations are often not feasible for day to day activities.

Another option to perform some degree of monitoring of an informant is to obtain a consensual wiretap on the informant's phone through a cellular carrier. The cellular carrier records calls placed to and originating from the informant's phone and passes the completed recordings to the support team. However, the cost of a consensual wiretap may run in excess of $6,000 per month and thus prevents the utilization of consensual wiretapping through cellular carriers for all but highest priority cases. Additionally, the support team may not receive the recorded data in real time, thus delaying the supports team's response time to urgent situations involving the informant. Further, the consensual wiretapping process from the carrier may only monitor call audio on the informant's device.

BRIEF DESCRIPTION OF THE DRAWINGS

The teachings of the embodiments can be readily understood by considering the following detailed description in conjunction with the accompanying drawings.

FIGS. 3B and 3C are tables illustrating example embodiments of virtual number mapping.

FIG. 5 is an interaction diagram illustrating a method for wiretapping an outgoing call from the informant device to a subject device according to one example embodiment.

DETAILED DESCRIPTION

Figure 1A:
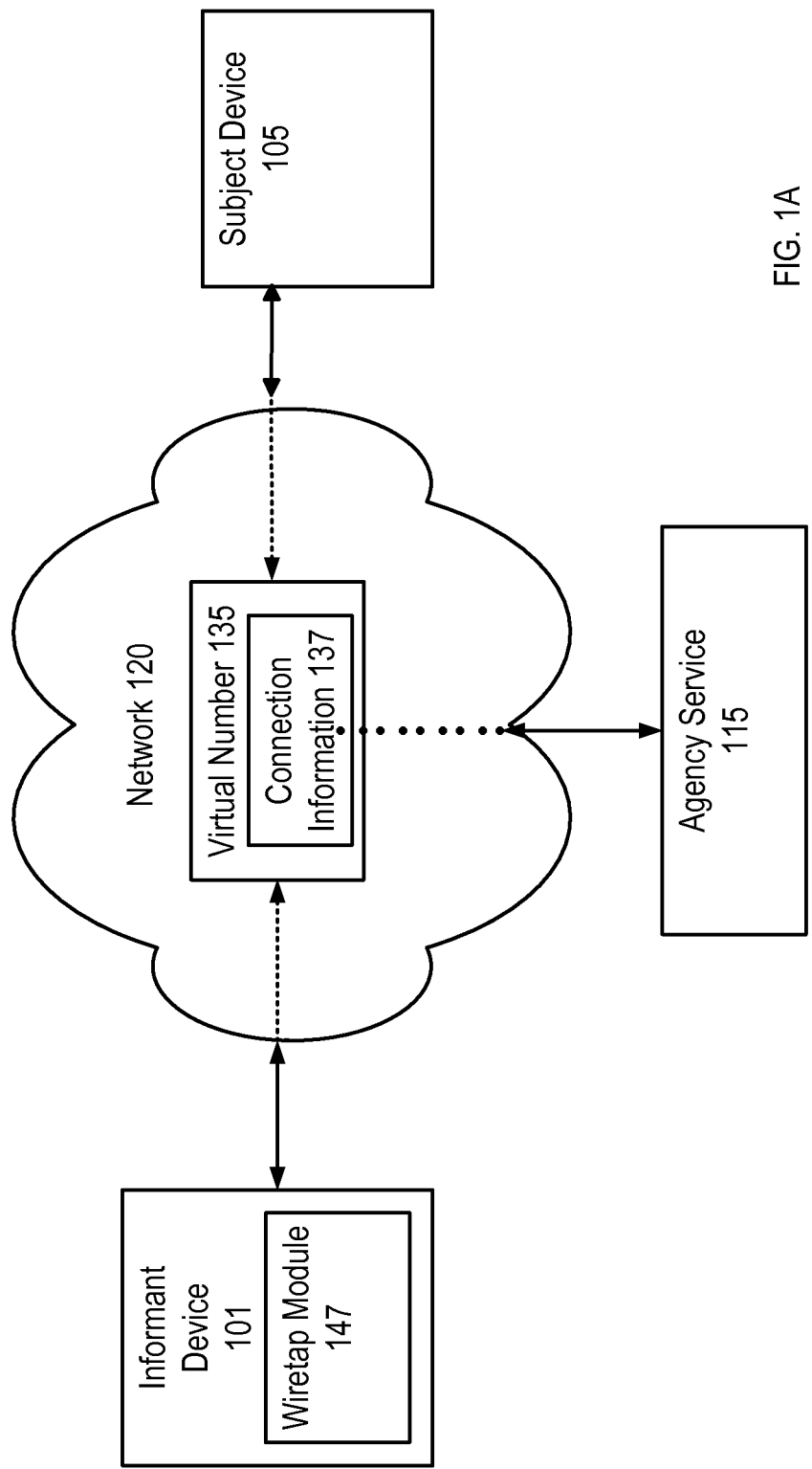
FIG. 1A is a block diagram illustrating an environment for implementing a wiretapping system according to one example embodiment.

The Figures (FIG.) and the following description relate to preferred embodiments by way of illustration only. It should be noted that from the following discussion, alternative embodiments of the structures and methods disclosed herein will be readily recognized as viable alternatives that may be employed without departing from the principles of the embodiments.

Reference will now be made in detail to several embodiments, examples of which are illustrated in the accompanying figures. It is noted that wherever practicable, similar or like reference numbers may be used in the figures and may indicate similar or like functionality. The figures depict embodiments for purposes of illustration only.

Overview

Embodiments of systems and methods described herein relate to covertly performing a wiretap of communications between the informant and the subject by routing the communications such that they can be recorded, generating an audio recording of call audio on the mobile device of the informant and/or obtaining copies of other communications and activities at the mobile device of the informant. The informant often works in cooperation with an agency and agrees to the wiretapping of their mobile device. However, the wiretapping must be done to covertly to protect the informant.

An agency service provides a wiretap module that is installed on the mobile device of an informant to covertly route and handle recordings or copies of calls, messages such as short message service (SMS) messages, and other communications in conjunction with the agency service. For example, the wiretap module, executing in the background on the mobile device of the informant (or "informant device"), may manage communications flowing through the informant device to facilitate monitoring of the communications by the agency service using a variety of modules contained therein, or may be broken out into individual modules that perform functions for the respective communication types independently. For example, separate modules may respectively handle audio telephonic communications and messaging. Additionally, separate modules may handle global position satellite (GPS) tracking, suppression of notifications associated with monitoring communication, registration of the mobile device with the agency service, and recordings such as backup recording of audio telephonic communications for transmission to a server.

In some embodiments, the wiretap module and/or the individual modules run as a background service(s) and re-launch if terminated and are set to start automatically in the background when the mobile device is turned on or restarted. The function(s) of the wiretap and/or individual module on the mobile device may be concealed such that the user may not interface with them directly or be aware of their existence. For example, the wiretap module may interface with native applications on the mobile device and covertly intercept communications initiated thereon such that the user may interact with the native applications on the phone to send and receive communications that are passed through the wiretap module(s) in the background. Alternatively, the wiretap module(s) or other modules configured to provide or make data available to the wiretap module may mimic the look and feel of the native applications such that the informant interacts with them, rather than the native applications, to communicate with subjects.

Depending on the embodiment, one or more monitoring devices are further configured to access and listen in on wiretapping activities. For example, the monitoring devices may access a web interface, API or execute a standalone application for viewing informant device collected communications information. Additionally, in embodiments where telephonic audio communications between the informant and the subject are routed by the wiretap module, the monitoring devices may monitor the audio communications in real time without compromising the informant's cover.

Environment and Implementation of the Wiretap System

FIG. 1A is a block diagram illustrating an environment 100 for implementing a wiretapping system according to one example embodiment. As shown the environment 100 includes a network 120 connecting an agency support service provider "agency service" 115, an informant device 101 and subject device 105. While only one agency service 115 and one informant device 101 are shown in FIG. 1A for clarity, embodiments can support many informant devices 101 and have multiple agency service providers 115 for managing the wiretapping of multiple informant devices 101.

Agency service 115 represents a collection of compute devices (e.g., servers) and associated storage mediums that are configured for performing various activities such as managing wiretappings, exchanging data over the network 120 and storing data in support of one or more agencies (not shown) and operated informant devices 101. For example, the agency service 115 may include one or more modules providing ascribed functionality to an agency via an application programming interface ("API") or web interface, collectively "the monitoring interface", as described in more detail with reference to FIG. 1B. The agency service 115 may also include infrastructure for providing audio and video communicability (e.g., internally and/or over the network 120) within the monitoring interface using the public switched telephone network ("PSTN"), voice over internet protocol ("VoIP") and video conferencing services.

The informant device 101 is oftentimes a mobile telephonic device capable of collecting data and transmitting data (e.g., wirelessly) over the network 120. Some examples of an informant device 101 include a mobile phone, tablet or notebook computer. Example embodiments of the informant device 101 as a mobile phone include feature phones, smart phones or standard mobile phones. Accordingly, a given mobile phone or other device operated as an informant device 101 may not necessarily include or support all of the functionality ascribed herein to the informant device or wiretapping system due to inherent differences in device capabilities. In some embodiments, other telephonic devices such as land-line phones are used with the wiretapping system.

In one embodiment, the informant device 101 executes a wiretap module 147 for automating the wiretapping of a variety of communications and data collection. The wiretap module 147 may coordinate the wiretapping of communications in conjunction with the agency service 115 or manage one or more processes locally (e.g., if certain functionality associated with the agency service 115 is not available). In turn, the informant device 101 and/or agency service 115 may collect and transmit wiretapping data to entities on the network 120. An example embodiment of a wiretapping module is described in more detail with reference to FIG. 2.

In addition to the informant devices 101, a number of monitoring devices (not shown) may connect to entities on the network 120 to obtain or present data associated with one or more of the informant devices and wiretapped communications. Depending on the embodiment, a monitoring device is a network 120 capable device that can be operated within an agency or externally in the field. For example, a monitoring device can be a mobile or stationary device capable of connectivity (e.g., wireless or wired) to a network 120 such as an agency network, the internet, PSTN and/or cellular network. Some examples of a monitoring device include a mobile phone, land-line phone, tablet and notebook or desktop computer.

Example embodiments of the monitoring device as a mobile phone can include feature phones, smart phones or standard mobile phones. In one example embodiment, the monitoring device executes a monitoring module for interfacing with entities on the network 120 to manage informant devices 101, wiretappings and view collected data.

Also shown is a subject device 105 associated with a subject the informant communicates with. Embodiments of the various subject devices 105 include any network 120 capable device that may send or receive information associated with a transmitting number on the network 120 (however, in some instances, the subject device 105 may use a virtual number itself, or other means, to do so). Accordingly, as referred to herein, a subject device 105 is a mobile or stationary device capable of connectivity (e.g., wireless or wired) to the network 120 for sending or receiving information over the internet, PSTN and/or cellular network. Some examples of a subject device 105 include a mobile phone, land-line phone, tablet and notebook or desktop computer.

FIG. 1A also illustrates a virtual number 135 configured for use on the network 120. In one embodiment, the agency service 115 provisions and configures the virtual number 135 and handles number information to establish an identity for the virtual number on the network 120. The agency service 115 receives connection information 137 describing informant devices 101 requesting to communicate using handled virtual numbers 135 and subject devices 105 connection requests to informant devices 101 routed through the virtual number 135. For example, an informant device 101 may request (and attempt) to communicate with a subject device 105 through a virtual number (e.g., 135) by way of an intermediate connection request or otherwise transmitting data to the virtual number. Number information for the virtual number 135 that is presented to the subject device 105 when the informant device 101 requests to communicate with the subject device 105 through the virtual number may be configured to match that of the informant device 101. Accordingly, communications from the informant device 101 that are routed through the virtual number 135 105 to establish communications between the devices 101, 105 appear to originate from the informant device 101. By establishing a connection through the virtual number 135, communications between the information device 101 and subject device 105 can be covertly monitored by the agency service 115, the agency, and authorized monitoring devices.

For wiretapping the informant device 101 when a subject device 105 initiates the communication request by dialing the transmitting number of the informant device 101 directly, the wiretapping module 147 on the informant device 101 forwards the communications request of the subject device 105 to the virtual number 135, which in turn enables the establishment of a connection between the devices 101, 105 through the virtual number 135. For example, by way of the informant device 101 forwarding the communications request of the subject device 105 to the virtual number 135, the subject device 105 may be identified as attempting to connect to the virtual number. In turn, the informant device 101 corresponding to the virtual number 135 is identified and subsequently dialed from the virtual number to establish a connection between the devices 101, 105 through the virtual number 135.

The agency service 115 identifies devices requesting to communicate with a virtual number as either the informant device 101 associated with the virtual number or a subject device 105 (and, in some cases, a monitoring device) based on the connection information 137 and configuration of the virtual number 135. For example, the agency service 115 may maintain a mapping table storing transmitting numbers and authentication information for a given informant device 101 and attached virtual numbers 135 for identifying the informant device based on the connection information 137. Additionally, the agency service 115 may maintain a mapping table identifying whether wiretapping should be performed for subject devices 105 attempting to communicate with the informant device 101. Thus, the wiretap module 147 on the informant device 101 may manage the routing of incoming and outgoing calls through a virtual number 135 configured by the agency service 115 to monitor communications at the information device 101. Additionally, in some instances, the wiretap module 147 may manage the recording of incoming and outgoing calls locally in instances where a virtual number 135 may not be utilized by the informant device 101.

For wiretapping communications when the informant device 101 requests to communicate through the virtual number 135, the agency service 115 identifies the transmitting number of the device as that of the informant device 101 using the mapping table. The agency service 115 information about of a given subject device 105 the informant device 101 is attempting to communicate with and, in turn, enables the informant device 101 to communicate with the subject device 105 through (e.g., by establishing a connection with or transmitting data from) the virtual number. For example, the informant device 101 specifies device information, such as a transmitting number, for the subject device 105. The wiretapping module 147 may manage this process covertly such that the user of the informant device 101 may simply dial the number of the subject device 105 in the native calling application and the wiretapping module 147 requests to communicate with the virtual number 135 instead. The agency service 115 identifies the informant device 101 from the connection information 137 and receives the device information for the subject device 105 for transmitting instructions to cause the subject device to receive a call from virtual number 135. If the subject device 105 answers, the parties are connected through the virtual number 135.

In turn, for wiretapping communications when the subject device 105 requests to communicate with the informant device 101, when a connection request is received at the information device 101 (e.g., from a number that does not match the virtual number 135) the wiretapping module 147 may conditionally call forward the connection request to the virtual number 135, in which case the agency service 115 determines that the transmitting number of the subject device 105, now requesting to connect to the virtual number, is not that of the informant device 101 from the mapping table. Thus, the agency service 115 may identify the device as the subject device 105. If the agency service 115 identifies the subject device 105 as being forwarded to the virtual number 135 in an attempt to communicate with the informant device 101, the agency service 115 transmits instructions to establish a connection with the informant device 101 through the virtual number. The agency service 115 may additionally transmit instructions to play a ring tone on the virtual number 135 to the subject device 105 such that the subject believes the original connection attempt is still in the process of being established. The informant device 101 may then be dialed from the virtual number 135 and the wiretap module 147 does not reject this connection request such that the informant may answer the call to open the connection with the subject device 105 through the virtual number 135. In some embodiments, number information for the subject is displayed instead of the virtual number 135 such that the informant can identify the subject's transmitting number.

The wiretap module 147 may receive connection information 137 from the agency service 115 or other entity about subject device 105 forwarded to the virtual number 135 and the number identity of the dialed virtual number or store identified information (e.g., from the initial connection request that was rejected) locally for display when the connection request from the virtual number 135 is received in place of any virtual number information. Accordingly, the informant may make an informed decision about the identity of the subject.

As described above, the agency service 115 provisions and configures virtual numbers 135 and handles number information to establish identities for the virtual numbers on the network 120. In some embodiments, the agency service 115 may additionally specify one or more monitoring devices (not shown) to notify when the informant device 101 utilizes a virtual number 135 for wiretapped communications. For example, the agency service 115 may maintain a mapping table storing transmitting numbers and authentication information for monitoring devices in associated with the virtual number 135. When the agency service 115 identifies an informant device 101 requesting to communicate using the virtual number 135 or a subject device 105 forwarded to the virtual number 135, the agency service 115 connects the parties while additionally notifying the monitoring device. The notifications themselves may come in different forms and are explained in more detail below. Additionally, for the other wiretapped communications the agency service 115 may receive from the informant device 101, monitoring devices identified from the mapping table may receive a notification of communication received at the agency service and/or automatically receive a copy of the communication.

In the case of wiretapping telephonic communications between the subject device 105 and the informant device 101, the agency service 115 identifies instances when the informant device 101 and the subject device 105 attempt to establish telephonic communications through the virtual number 135. In turn, the agency service 115 may transmit instructions (e.g., to a provider) to dial out to the monitoring device and connect the monitoring device with the virtual number 135. When connected to the virtual number 135, the monitoring device receives the audio data corresponding to live communication between the subject device 105 and informant device 101 through the virtual number 135. In order to prevent subject suspicion as to the informant's identity or the communications being monitored, audio transmissions from the monitoring device to the virtual number and any audio associated with establishing the connecting between the monitoring device and the virtual number is disabled. If a monitoring device declined to join on the call, or requested to only be notified, the agency service 115 or provider may transmit or otherwise provide audio recorded on the virtual number 135 (and transcripts thereof) to the monitoring device. Transcripts, copies of wiretapped communications, and/or audio thereof may, for example, be provided via SMS/MMS message, email or other means via the agency service 115 to the monitoring device such as through the interface of the agency service to a monitoring module at the monitoring device and/or natively. Alternatively, a location of the transcript and call audio for streaming from a server (e.g., of the agency service 115) may be provided via SMS, email or other means such as through the monitoring module.

The network 120 represents the communication pathway between agencies, agency service 115, the informant devices 101, subject devices 105, monitoring devices and other entities (not shown). In one embodiment, the network 120 includes standard communications technologies and/or protocols and can include the Internet and PSTN. Oftentimes, these communications technologies and/or protocols carry both PSTN and Internet related data. Thus, the network 120 can include links using technologies such as Ethernet, 802.11, worldwide interoperability for microwave access (WiMAX), 2G/3G/4G mobile communications protocols, worldwide interoperability for PSTN communications, digital subscriber line (DSL), asynchronous transfer mode (ATM), InfiniBand, PCI Express Advanced Switching, etc. Similarly, the networking protocols used on the network 120 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 120 can be represented using technologies and/or formats including analog audio (e.g., for last mile PSTN communications), digital audio and video (e.g., as a file or streaming with Real Time Streaming Protocol), the hypertext markup language (HTML), the extensible markup language (XML), JavaScript, VBScript, FLASH, the portable document format (PDF), etc. In addition, all or some of the data exchanged over the network 120 can be encrypted using conventional encryption technologies such as secure sockets layer (SSL), transport layer security (TLS), virtual private networks (VPNs), Internet Protocol security (IPsec), etc. In another embodiment, the entities on the network 120 can use custom and/or dedicated data communications technologies instead of, or in addition to, the ones described above. For example, some government agencies and the military may operate networks auxiliary to the internet and PSTN.

As used herein, the term "module" refers to computer program instructions and/or other logic used to provide the specified functionality. Thus, a module can be implemented in hardware, firmware, and/or software. In one embodiment, program modules formed of executable computer program instructions are stored on a non-transitory storage device, loaded into memory, and executed by a computer processor as one or more processes.

As used herein, the terms "message," "messaging," and "short messaging service (SMS)" each comprise the breadth of messaging services and related technologies or standards used for communicating and transmitting data over the network 120. These technologies and services include SMS messages, multimedia messaging service "MMS" messages, proprietary messaging service messages such as BLACKBERRY messages "BBM" and the like.

Figure 1B:
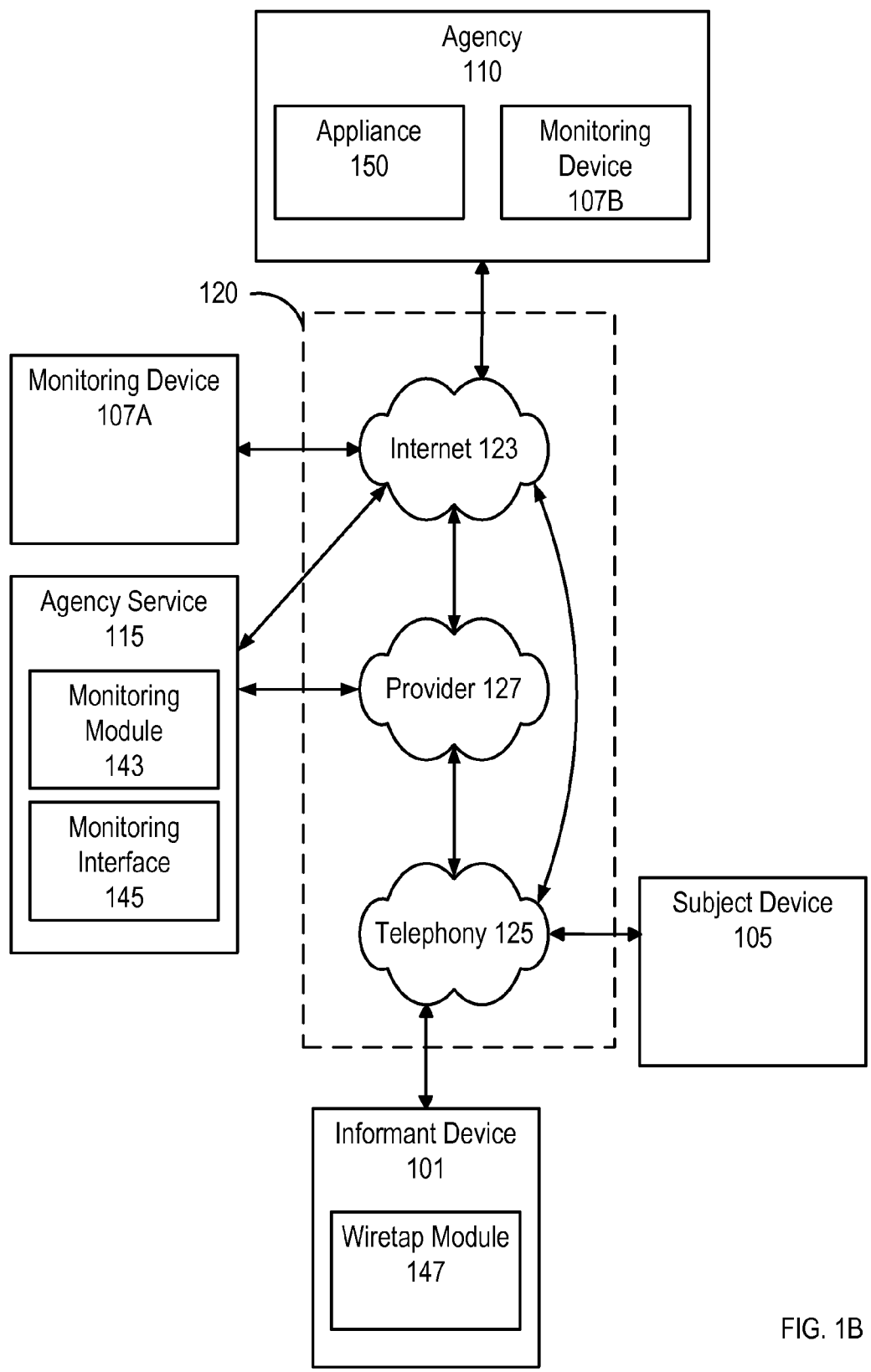
FIG. 1B is a block diagram illustrating an operating environment of an agency service managing a wiretapping system according to one example embodiment.

FIG. 1B is a block diagram illustrating an operating environment of an agency service 115 providing virtual numbers according to one example embodiment. As shown, the operating environment includes an agency 110, monitoring devices 107, informant devices 101, subject device 105 and a network 120 with components such as the internet 123, telephony 125 and provider 127. The network 120 may also include GPS satellites (not shown) that relay position data to informant devices 101 and other devices.

Agency 110 represents a collection of servers, desktop, notebook or tablet computers, mobile telephones and related storage mediums used by respective agency personnel for executing applications or modules to communicate with and receive data from the agency service 115 (e.g., via the interface 145) and other entities on the network 120. For example, agency 110 devices may execute a web browser to access a web interface or execute a mobile or desktop application for communicating with an API provided by the agency service 115. An agency 110 may also include telephonic and video infrastructure enabling audio and video communicability (e.g., internally and/or over the network 120) using the public switched telephone network ("PTSN"), voice over internet protocol ("VoIP") and video conferencing services for monitoring or specifying configurations for using informant devices 101 with virtual numbers 135.

The telephony network 125 may include servers, switches and other hardware and software for implementing, among other protocols and technologies, worldwide interoperability for PSTN communications including land-lines and 2G/3G/4G wireless protocols. The telephony network 125 also provides mobile devices with the capability to transmit and receive data over the internet 123. The telephony network 125 is managed by one or more communication service providers "CSPs" (not shown) that own telephone numbers for use on the PSTN and the CSPs own network (e.g., a wireless network that communicates with the PSTN).

The provider 127 may include servers, switches and other hardware and software for communicating over the network 120 with CSPs and other entities. The provider 127 buys or leases numbers for use on the telephony network 125 from multiple CSPs. The provider 127, in turn, manages numbers provisioned for use by the agency service 115 and the telephony traffic associated with the numbers. In one embodiment, the agency service 115 provisions one or more of the numbers as virtual numbers over the network 120 with the provider 127.

Typically, a number used on the telephony 125 network directs to a given mobile device, VoIP device or land-line device having an associated number identity characterized by automatic number identification "ANI" information, or caller identification. Virtual numbers, while still operable with the PSTN and CSP networks, are associated with the provider 127 who handles telephony traffic for the number. Because a virtual number does not direct to an end user device, the provider 127 may facilitate operations to establish connections with devices dialing the virtual number, record call information such as call audio and caller history (e.g., on a computer readable medium) and stream/provide call information for download (e.g., over the network 120).

The provider 127 may also pass/bridge audio (bidirectional or unidirectional) in real-time between two or more telephonic devices establishing connections with the same or different virtual numbers (or connected by the provider 127 via a virtual number). Additionally, as the virtual numbers are handled by the provider 127, the agency service 115 may modify number information such as ANI information and caller identification associated with the virtual number.

In addition to provisioning virtual numbers for the agency service 115, the provider 127 communicates notifications and data associated with the virtual numbers to the agency service 115 or other entity such as the agency 110. For example, the provider 127 may notify the agency service 115 (and optionally an informant device 101 or monitoring device 107) of an incoming caller to the virtual number and receive instructions from the agency service 115 to connect the caller to the virtual number (or another device) to initiate a wiretapping. In a specific example, the agency service 115 may provide instructions for the provider 125 to notify a monitoring device (e.g., 107A) in response to use of the virtual number. The provider 125, in turn, may dial out to the monitoring device 107A via the virtual number (or other virtual number) and pass (or bridge) audio such that the monitoring device 107A receives the audio transmissions between the informant device 101 and subject device 105 or monitors a wiretapping on the virtual number. The provider 127 may also receive instructions to stop/start recordings of calls placed to the virtual number and interface with a transcription service to transcribe call audio. In turn, the provider 127 can transmit the recordings and transcripts to the agency service 115 or other entity on the network 120.

Additionally, the provider 127 may enable or disable inbound and/or outbound audio for different parties such as a monitoring device 107A connecting to a virtual number and recordings thereof responsive to instructions received (e.g., via an API) from the agency service 115. The provider 127 can receive instructions for managing a virtual number and notifications as part of the provisioning process, prior to an incoming call or in real-time from the agency service 115 when connecting an incoming caller to the virtual number. In some embodiments, the provider 127 communicates directly with the agency 110, informant device 101 and/or monitoring device 107 to provision virtual numbers, transmit notifications and data or receive instructions. Additionally, the provider 127 itself may function as a CSP and vice versa.

The agency service 115 receives requests for provisioning and mapping virtual number from the agency 110 or monitoring device 107. Additionally, the request may be made from an informant device 101 via the wiretap module 147 during initial configuration. The requests may include number information for provisioning virtual numbers such as an area code (e.g., 555), country code (e.g., +44) and/or associated CSP. In turn, the agency service 115 queries the provider 127 for available virtual numbers matching the request and returns the matching virtual numbers to the requesting entity. The agency service 115 subsequently receives a selection of virtual numbers from the requesting entity and claims the virtual numbers from the provider 127.

When provisioning a virtual number, the agency service 115 may optionally allow the entity to specify number information such as ANI and/or caller identification associated with the virtual number to spoof the number's identity on the network 120. Thus, for example, outbound caller information (e.g., for calls placed to a subject device 105) for the virtual number may match the informant device 101. The agency service 115, in turn, transmits instructions to the provider 127 for modifying the number identity. The agency service 115 may optionally verify the spoofed number identity. When a virtual number is no longer needed by the agency 110, the agency service 115 obtains any audio recordings or call logs associated with the virtual number and releases the number back to the provider 127.

Additionally, the agency service 115 may optionally allow the entity to specify number information such as a ring tone for provisioned virtual numbers. The specified ring tone may be used to spoof the location where the number is being used on the network 120 or mimic a custom ringtone when played for the subject. Specifically, as ring tones can differ between countries, and for a host of other reasons, the agency service 115 may enable the entity to configure the virtual number with the provider 127 such that a specified ring tone is played when parties (e.g., a subject) are forwarded to the virtual number to communicate with the informant 101. In a real world example, if the virtual number is based in the United Kingdom and the subject expects the informant using the virtual number to be in the United States, the subject may hear (incorrectly) the ring tone for the United Kingdom when forwarded through to the virtual number (rather than the expected United States ring tone). Accordingly, the agency service 115 may provide a list of ring tones (e.g., for different countries) and/or enable the upload of a desired ring tone for playback. The agency service 115, in an embodiment, may monitor the location of the informant device 101 and/or receive location updates for the informant device 101 from the agency 110 and/or informant device 101 via the wiretap module 147 for determining the ringtone automatically. The agency service 115, in turn, transmits instructions to the provider 127 for configuring the virtual number with the desired ring tone for playback. Thus, the cover of the informant may be maintained when the subject dials the virtual number and a wiretapping is generated.

The requests can also include mapping information for configuring claimed virtual number function in a mapping table. Depending on the desired configuration, the mapping information may include the transmitting number of an informant device 101 and/or and monitoring device 107, virtual number for association with the device and/or desired function of the virtual number, such as whether to generate a recording when the virtual number is utilized by the informant to receive or place a call and any specific ring tone that should be played back to the subject device. One example mapping request may specify a claimed virtual number for use as a virtual number that the informant device 101 connects to in order to transmit collected data (e.g., audio) over the telephony 125 network from the virtual number's identity spoofed for the informant device (e.g., to subject devices 105). Another example mapping request may specify that wiretappings should be generated locally using the wiretapping module 147 or using the virtual number when a subject dials the informant device 101 or vice versa. Instructions may be transmitted to the wiretapping module 147 and/or provider 127 to facilitate the operation. In response to the request, the agency service 115 associates the transmitting number of the informant device 101 with the virtual number and stores the association in a mapping table, and also indicates the wiretapping configuration in the mapping table.

In some embodiments, a mapping request may optionally include the transmitting number of a monitoring device 107 which the agency service 115 associates with a virtual number to identify the monitoring device. As multiple monitoring devices 107 may monitor call audio, the agency service 115 may store multiple transmitting numbers of monitoring devices in association with a single virtual number in a mapping table.

Embodiments of the mapping table may also indicate whether a specific ring tone should be used when a subject device attempts to communicate with the informant device 101 through the virtual number 135. Additionally, embodiments of the mapping table may also identify functions for the wiretapping module 147 to perform on the informant device 101. For example, when generating a wiretapping, the wiretapping module 147 may be configured to store the call audio locally or route the call through the virtual number.

In practice, agency service 115 consults the mapping table to automatically identify a device connecting to a virtual number as the informant device 101, monitoring device 107 or subject device 105 based on the device's transmitting number. Thus, for example, the wiretap module 147 may dial a virtual number mapped to the transmitting number of the informant device 101 to place a call from the virtual number (e.g., to a subject device). Additionally, the informant device 101 may receive calls from the subject by way of the wiretap module 147 redirecting the subject device 105 attempting to connect to the informant device 101 through the virtual number and the mapping table identifying the informant device 101 to re-dial out to (and where the wiretap module 147 does not redirect the call from the virtual number, instead allowing the informant to act on the call).

Embodiments of the agency service 115 use the mapping of the informant device 101 and wiretapping configuration for a virtual number for instructing the provider 127 to automatically connect subject devices 105 on the virtual number and play a ring tone for the subject device. In turn, the mapping of the informant device 101 to the virtual number may be used to dial out to the informant device to and establish the connection through the virtual number. Additionally, embodiments of the agency service 115 use the mapping of the informant device 101 to virtual numbers for identifying when the informant device desires to connect to a subject device 105, and the wiretap module 147 routes the connection through the virtual number and instructing the provider 127 to dial (e.g., from a virtual number) the subject device 105 specified by the wiretap module 147 (e.g., based on the subject device information entered by the informant) and connect the parties.

Additionally, embodiments of the agency service 115 can use the mapping of monitoring devices 107 to virtual numbers (e.g., directly, or via an associated virtual number) for instructing the provider 127 to automatically dial (e.g., from a specified virtual number or the virtual number) or otherwise notify (e.g., a SMS message) monitoring devices when recordings are generated, calls are placed or received using a given virtual number, or when other communications of the informant device 101 are available for viewing. The agency service 115 may also notify monitoring devices 107 through the interface 145 or via email.

In some embodiments, the agency service 115 provides a wiretap module 147 to the informant device 101. The wiretap module 147 interfaces with the native dialer of the informant device 101 to automate the connection process to a given subject device 105 for wiretapping communications. The wiretap module 147 may transmit the collected data over the network 120 back to the agency service 115 or other entity. The agency service 115, in turn, may store the collected data for transmission to one or more monitoring devices 107 and the agency 110. Furthermore, the wiretap module 147 may be configured with a password or otherwise disguised when executed to prevent users other than the informant from accessing the module altogether and/or particular features. The wiretap module 147 is described in more detail with reference to FIG. 2.

In some embodiments, the agency service 115 includes a monitoring interface 145 for providing recorded communications and other data collected, either on the virtual number or received from the informant device 101, and call audio between informants and subjects to various monitoring devices 107 and/or appliances 150 over the network 120. For example, the interface 145 may provide monitoring devices 107 with data corresponding to the status (e.g., connected or disconnected) of one or more informant devices 101 and the corresponding virtual number and subject device information. If the informant device 101 is transmitting real-time data or connected to a subject device 105, the interface 145 can stream data such as audio from the active transmission (e.g., on the virtual number), GPS coordinates with heading, speed and coordinates of last-reported locations for placement on a map, and the internet protocol address and/or telephone numbers of other personnel monitoring or having access to the informant device or virtual number. In some embodiments, the interface 145 syncs collected data prior to transmission or includes tags in the transmitted data for synchronization of playback at the monitoring device 107.

In some embodiments, the agency service 115 provides a monitoring module 143 to monitoring devices 107 for accessing the interface 145. The monitoring module 143 transmits requests associated with configuring an informant device 101 and receiving real-time and historic data. For example, the monitoring module 143 may provide a user interface or status dashboard with options for provisioning virtual numbers, mapping a transmitting number of an informant device 101 or monitoring device 107 to a given virtual number and configuring wiretappings on a virtual number. Additionally, the monitoring module 143 may further enable the configuration of settings at the wiretap module 147 of an informant device 101. In one embodiment, the dashboard provides an option to toggle a wiretapping session or bi-directional recording session on or off with the agency service 115. When a recording session is disabled, the monitoring device 107 or informant device still receives real-time data, but the agency service 115, appliance 150 and provider 127 do not store copies of the collected data.

The monitoring module 143 may also display real-time status information for the informant device 101 including current GPS location, tracked GPS location, live audio, mapping table information and other information collected from the informant device 101, or virtual number and streamed by the interface 145. Similarly, the monitoring module 143 may be used to access and playback historic activity associated with a given virtual number or informant device 101. For example, the monitoring module 143 may download files such as wiretappings for playback or stream them. In addition to interfacing with the agency service 115, the monitoring module 143 may interface with an appliance 150 that stores (or backs up) collected data within the agency 110.

The monitoring module 143 may interface with the native dialer of the monitoring device 107 and notify the monitor when connection requests from virtual numbers are received (e.g., in instances where the monitoring device 107 is dialed in to monitor a call). Embodiments of the monitoring module 143 may also be configured to automatically establish the connection with the virtual number. The monitoring module 143 may display information for the virtual number and, optionally, the subject device 105 and/or informant device 101 using the virtual number with the notification. Displayed information for the virtual number, informant device 101, and/or subject device 105 may include associated number information, mapping information, and/or case information stored at the agency service 115, provider 127, and/or appliance 150. For example, the monitoring module 143 may communicate with the agency service 115 and/or appliance 150 to receive mapping information and case information corresponding to virtual numbers (and informant devices) the transmitting number of the monitoring device 107 executing the monitoring module 143 is authorized to monitor.

In one embodiment, the agency 110 includes an appliance 150 for storing data such as wiretappings collected by informant devices 101 and virtual numbers. The appliance 150 may utilize the monitoring interface 145 provided by the agency service 115 for updating stored data or receive data directly from informant devices 101. Additionally, the appliance 150 may receive audio recorded on a virtual number and associated transcripts from the provider 127 or agency service 115. One example embodiment of the appliance 150 also includes its own interface (not shown) that enables monitoring devices 107 to access real-time and historic data stored on the appliance for a virtual number. Interfaces provided by the agency service 115 or appliance 150 may also be accessible via a web browser for streaming or downloading data and include the same or similar options as the monitoring module 143.

The monitoring module 143 may also include a linguist interface. "Linguist" is the term generally used to describe anyone monitoring the informant in real-time and/or as collected information from the virtual number and/or wiretap module 147 is made available on the monitoring interface 145. The linguist takes notes about what happened on each call or with other collected data such as an SMS or email and/or transcribes them verbatim. The notes are associated with the respective communication.

In addition to taking notes on each call, the linguist interface may have a "Minimize" button, which may be pressed when a call they begin listening to is determined to be "Non-Pertinent," such as a call between an informant and his mother when they're really in search of (pertinent) calls between the informant and a subject. In turn, the monitoring module 143 may mark the call as non-pertinent and transmit an instruction to the agency service 115 via the monitoring interface 145 to stop the live monitoring and delete any audio recorded prior to the minimization.

Additionally, the appliance 150 and agency service 115 may communicate to intermittently update collected data and records at defined intervals or in response to notifications to download data. During the intervals or notification periods, the agency service 115 may process the data and perform any necessary actions for the monitoring device 107 until the data is transferred to the appliance 150. In some embodiments, the agency service 115 maintains a persistent connection with the appliance 150 to facilitate transfer of real-time data collected from the informant devices 101 operated in the field.

In one embodiment, the agency service 115 ensures that it, and the provider 127, do not possess data collected from the informant devices 101 or from a virtual number beyond the time needed to facilitate transfer. However, in mission critical situations, informants and other agency 110 personnel cannot rely only on the availability of the appliance 150 for storing and maintaining collected data. Consequently, if the appliance 150 is unable to take possession of the collected data or go offline during transfer, the agency service 115 and/or the provider 127 may maintain possession of the collected data until the appliance 150 is functioning. Furthermore, the agency service 115 and/or provider 127 may determine whether checksums, hashes or sizes of transferred data match the appliance's 150 version prior to deleting stored data.

In some embodiments, the agency service 115 maintains an appliance instead of, or in addition to, the agency 110. In such cases, the appliance may exist as a dedicated piece of hardware or remote storage. Alternatively, embodiments of the appliance 150 may be implemented in a cloud computing and storage stack available on the network 120.

Wiretap Module Functionality

Figure 2:
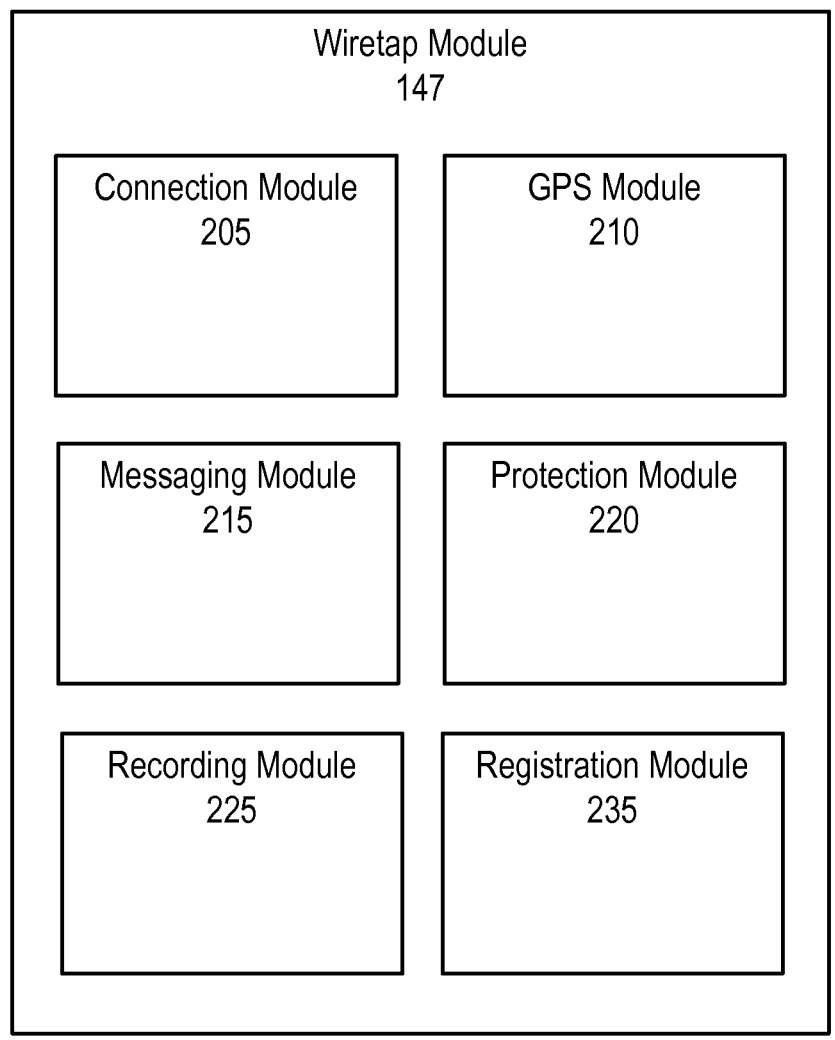
FIG. 2 is a block diagram illustrating a wiretap module according to one example embodiment.

FIG. 2 is a block diagram illustrating a wiretap module 147 according to one example embodiment. The wiretap module 147 may be downloaded from the agency service 115 to the informant device 101 and executed to facilitate wiretappings and transmit data to entities on the network 120. In other instances the wiretap module 147 may be installed directly to the informant device 101. As shown in FIG. 2, the wiretap module 147 itself includes multiple modules. In the embodiment shown in FIG. 2, the wiretap module 147 includes a connection module 205, GPS module 210, messaging module 215, protection module 220, recoding module 225, and registration module 235. In some embodiments, the functions are distributed among the modules in a different manner than described herein. Other embodiments have fewer, additional and/or other modules (e.g., based on the device capabilities).

The registration module 235 interfaces with the provider 127 or agency services 115 to register the informant device 101 with the wiretap system. The registration module 235 may execute upon installation of the wiretap module 147. In one embodiment, the user enters and activation key which the registration module 235 transmits to the agency service 115 along with known device information, such as Device Number, Make/Model of Phone, IMEI, OS Version, etc. The IMEI or International Mobile Equipment Identity is a unique number assigned to mobile telephonic devices, typically found behind the battery. IMEI numbers of mobile devices connected to a cellular network are stored in a database know as an EIR (Equipment Identity Register) containing all valid mobile phone equipment. When a phone is reported stolen or is not type approved for operation on the network, the number is marked invalid. The number consists of four groups that may be formatted: nnnnnn-nn-nnnnnn-n. The first set of numbers is the type approval code (TAC). The first two digits represent the country code. The rest make up the final assembly code. The second group of numbers identifies the manufacturer. The third set is the serial number and the last single digit is an additional number (usually 0).

The agency service 115 may validate the key and transmit back the virtual number which has been assigned to the informant device 101. In turn, the registration module 235 stores the virtual number for use at the connection module 205 to facilitate automation of inbound and outbound calling operations through the virtual number. Further, in some instances, the agency service 115 and/or monitor device 107 may communicate with the registration module 235 remotely to activate or deactivate specific modules, add new modules (such as GPS tracking module 210), change the Virtual Number, or modify other configuration aspects. After registration, the protection module 220 may be executed to ensure that the function and execution of the wiretap module 147 on the informant's device 101 is hidden from any user. In one embodiment, the registration module 235 stores the wiretap configuration information stored in the mapping table at the agency service 115 for the virtual number/ informant device 101 to determine whether to make no recording of a call, a local recording of a call utilizing the recording module 225, or whether a recording should occur through the virtual number.

In some embodiments, the agency service 115 and monitoring device 107 may transmit instructions to the wiretap module 147 on the informant device 101 to disable its function or uninstall itself from the informant's device 101. Hence, when the informant no longer needs to participate in the wiretapping service, the wiretapping functionality on the informant device 101 may be disabled remotely. In some instances, the registration module 235 may include a timer corresponding to the duration for which the informant agreed to consensual wiretapping. When the timer expires, the registration module 235 may automatically unregister the informant device 101 with the agency service 115 causing the wiretapping module 147 to deactivate and optionally uninstall itself from the device.

Additionally, in some embodiment, the agency service 115 and monitoring device 107 may transmit instructions to the registration module 235 specifying that only certain communication types and/or certain subjects identified by their names, addresses (e.g., email) or transmitting numbers (e.g., of the subject's device) should be monitored. The wiretapping module 147 may ignore non-specified communication types and/or names, addresses (e.g., email) and transmitting numbers.

The connection module 205 automates the connection process at the informant device 101 for connecting the informant device 101 to the subject device 105 through the virtual number. If no recording is to be made through the virtual number, the connection module 205 may allow incoming and outgoing calls to proceed as normal.

Outbound Call Process

When a user of the informant device 101 requests to connect to a subject (e.g., through the native dialer or selection of a contact from an address book), the connection module 205 terminates the call and generates a graphic on the display that mimics operation of the informant device 101 as if the call is still in process to connect to the subject. In turn, the connection module 205 stores the information entered by the user and requests to connect to (e.g., dial) the assigned virtual number instead. Any function (e.g., visual indication, sound, or keyin) associated with dialing the virtual number is suppressed from the user.

In one embodiment, the connection module 205 transmits subject device 105 information to the agency service 115 prior to and/or as the connection with the virtual number is being established. An example transmission may include, OUTBOUND REQUEST:/mobile_app/dial_in?q={"request":{"action identifier":101,"vn_number":"8134404213", "informant_number":"2022947330", "subject_number":"6103345566", "IMEI":"AA-BBBBBB-CCCCCC-EE"}}

As shown, the outbound request instructs the agency service 115 to expect an incoming call from the informant device 101 to the virtual number, and whose intention is to reach the specified subject device. Once the outbound request is processed, the agency service 115 may send a response back to the connection module 205 to acknowledge receipt of the request.

The connection module 205 may listen for a response generated by the agency service 115. Example response may include, OUTBOUND RESPONSES: bad number {"response":{"status":200,"error":3,"message":"bad number"}} where The bad number response notification instructs the connection module 205 to perform a default action for the informant device 101 that indicates to the user that the subject device number was incorrectly entered as would occur if connecting to the subject device directly and any attempted connection to the virtual number is aborted.

Another response may indicate that the virtual number indicated by the connection module 205 is invalid, for example, the response may be deleted number {"response": {"status":200,"error":4,"message":"deleted number"}}. The deleted number response indicates the virtual number was released by the agency service back to the provider and is no longer valid. In response, the registration module 235 may be notified to register a new virtual number to the informant device 101, or the call may simply fail and notify the agency service 115 that an expired or unauthorized device is attempting to make an outbound call.

A device number bad response, such as {"response": {"status":200,"error":8,"message":"nomatch"}}, may instruct the connection module 205 that no mapping information for the supplied transmitting number could be identified. In turn, the connection module 205 may employ the registration Module 235 to register the informant device with the wiretapping system, or the call may simply fail and notify the agency service that an expired or unauthorized device is attempting to make an outbound call.

A call initiate response, such as {"response": {"status": 200,"message":"ok"}} notifies the connection module 205 that the agency service 115 and provider 127 are ready to establish a connection between the informant device 101 and the subject device through the virtual number. In one embodiment, the connection module 205 waits for a call initiate response prior to requesting to connect to the virtual number. In another embodiment, the connection module 205 requests to connect to the virtual number and cancels the connection request when a call initiate notification is not received within a specified time frame. In either instance, the informant device 101 requests to connect to the virtual number and a connection with the virtual number is established. The agency service 115 identifies the informant device 101 via the mapping table and instructs the provider 127 to configure the corresponding virtual number to spoof the number information of the informant device 101 and establish a connection with the subject device 105 identified from the provided transmitting number of the subject device. Thus, the subject device 105 receives a connection request from the virtual number that appears to originate from the informant device 101.

The outbound requests and responses may be transmitted and received by the information device 101 and/or agency service 115 over a data connection, via SMS or other means. For example, after dialing a subject and pressing send, the connection module 205 interrupts the call and sends an SMS with the outbound request information to the agency service 115. The agency service 115 in turn returns an SMS with the appropriate outbound response to the connection module 205. The SMS instructions to/from the agency service 115 may be purged from or otherwise suppressed from appearing in the informant device 101 logs visible to the user by the protection module 220.

In an alternate embodiment, the connection module 205 establishes a connection with the virtual number and the informant device 101 is identified by the transmitting number using the mapping table at the agency service 115. In turn, once connected to the virtual number, the connection module 205 may provide the transmitting number of the subject device and any authentication information via key entries (i.e., tones) once the connection with the virtual number is established. The agency service 115 then configures the virtual number in a similar fashion as described above to establish the connection with the subject device 105.

Inbound Call Process

In another embodiment, the connection module 205 may be configured to automatically identify and covertly forward incoming directly dialed calls (i.e., from transmitting numbers other than the virtual number) to the virtual number by entering a conditional call forwarding command prior to any device activity displayed to the user. For example, the connection module 205 may utilize conditional call-forwarding busy/rejected command by entering, for example, **67*[Virtual Number]#. With conditional call-forwarding, when the subject dials the informant device 101, the connection module 205 rejects the call immediately, causing the connection request to be conditionally forwarded to the virtual number specified in the conditional call forwarding command. The protection module 220 may also suppress any indication such as a ring tone or screen wake-up that could indicate a connection request has been received.

Temporally proximate to rejecting the connection request from the subject device 105, the connection module 205 identifies a subsequent call from the virtual number to which the subject device 105 has been forwarded to and identified as requesting to connect to the informant device 101 via the virtual number by the agency service 115. In turn, the connection module 205 enables the informant device 205 to ring as usual. However, depending on the embodiment, the connection module 205 and/or protection module 220 may alter the number information displayed for the incoming connection request to match that of the subject device. For example, in one embodiment, the connection module 205 may store the number information received for the subject device 105 from the initial connection request for display to the user in place of the number information for the virtual number. Thus, for example, when the second incoming connection request is received from the virtual number the number information for the subject device 105 may be displayed in a native incoming call screen. As the connection module 205 and/or protection module 220 suppress indication of the first connection request received at the informant device 101, the second connection request appears, to the user of the informant device, to be the only incoming connection request received at the informant device. In turn, the user of the informant device 101 acts on the second connection request to communicate with the subject. For example, when the user of the informant device 101 accepts the second connection request, the informant device 101 and subject device 105 are connected by way of the virtual number to enable audio communications.

Alternatively, the agency service 115 may modify the number information for the virtual number to spoof that of the subject device 105. The connection module 205 detects this incoming connection request as the second incoming request from the virtual number as it is received temporally proximate to, and has same number information as, the initial request from the subject device 105 which was conditionally forwarded to the virtual number. Accordingly, the connection module 205 may allow the number information for the incoming connection request to be displayed directly as it will match that of the subject device 105. The agency service 115 may alternatively spoof a different number identity that the connection module 205 identifies and replaces with the stored number information for the subject device 105 as described above.

In any instance, the connection module 205 displays the number information for the subject device 105 such that the incoming connection request appears as if it is coming directly from the subject device 105 and not forwarded through the virtual number.

To prevent an instance where a second subject dials the informant device 101 during the intermediate time where the connection module 205 has conditionally forwarded the first subject and is waiting for the second connection request, stored number information for the first subject, the virtual number, or specified spoofing of the virtual number may be maintained at the connection module 205. In turn, the connection module 205 may only allow a connection request to be displayed to the user if one of these conditions is met within a specified period of time, e.g., 15 seconds. If the condition is not met, i.e., when a second subject device 105 attempts to connect to the informant device 101, that connection request is rejected and conditionally forwarded to the virtual number. Thus, in cases where the first subject device is connected to the virtual number and the agency service 115 and provider 127 are in the process of establishing the connection through the virtual number with the informant device 101, the second subject receives a busy signal or is forwarded to a voice mailbox as expected.

In another embodiment, incoming calls are rejected by the connection module 205 and forwarded to the Virtual Number as described above, but instead of being routed back to the informant device 101 as a second connection request, the connection module 205 receives an incoming VoIP connection request. In turn, the connection module 205 displays subject device 105 information (e.g., stored from the initial forwarded request) such that the incoming VoIP connection request resembles a regular call for the user of the informant device 101 to act on.

The recording module 225 may locally record and store calls placed to the informant device 101. Thus, if a virtual number isn't available for the connection module 205 to forward incoming connection request to (e.g., in Afghanistan) then the connection module 205 may enable the incoming connection request to proceed as normal except that the recording module 225 stores a recording of the call audio and subject device information which may be transmitted to the agency service 115 (e.g., cloud, server, or on-site storage appliance) along with the call metadata along with it (to, from, duration, IMEI, location at time of call, contact name called per address book, etc.). The connection module 205 may similarly allow direct outbound calls to a subject device 105 if a virtual number is not available and the recording module 225 may record similar data for transmission to the agency service 115.

Further, in some embodiments, the agency service 115 or monitoring device 107 may interface with the recording module 225 to record sound picked by the microphone of the informant device 101 outside of a telephonic connection. For example, the recording module 225 may detect VoIP or other audio communication methods (e.g., a personally recorded message or memo) and transmit copies of the recorded audio to the agency service 115.

In one embodiment, these surreptitious recordings using the recording module 225 are performed through an open VoIP connection from the agency service 115 and the recording module 225 and/or connection module. The VoIP connection remains active and the recording module 225 transmits any audio collected on the microphone of the informant device 101.

The GPS module 210 monitors and transmits the informant device's 101 location (e.g., as determined through GPS, cellar tower location, and/or WiFi location identification on the device) to the agency service 115 at a regular interval, when the device enters or leaves a geofenced area, transmits/collects data, otherwise communicates with a subject device, or as polled by the agency service 115 and/or monitoring device 107. If a data connection is not active on the phone, GPS location can be sent at an interval via SMS to the agency service 115, where the device Number/IMEI and location of the phone are texted to the agency service 115 and the protection module 220 purges the history as not to arouse suspicion.

The messaging module 215 monitors the informant device 101 and identifies instances of new inbound or outbound messages or emails on device storage or SD card. In some embodiments, the messaging module 215 also monitors a "Drafts" folder/storage to send messages composed but not sent. In one embodiment, the messaging module 215 transmits identified messages to the agency service 115 as a JavaScript Object Notation (JSON) string over a data connection, including sender and recipient (e.g., phone number or emails addresses), date/time, message content, IMEI. For example:

Example Request Array:

```
$data = array(  'action'      => 6, -- Describes the type of communication
                'IMEI'        => 'AA-BBBBBB-CCCCCC-EE',
                'date_time'   => '2013-02-05T02:15:22Z',
                'data_text'       => 'This is a sample text',
                'from'        => '+17271112222',
                'to'          => '+18132223333');
```

Example Request in JSON Format:

{"request": {"action":6,"IMEI":"AA-BBBBBB-CCCCCC-EE","date_time":"2013-02-05T02:15:22Z", "data_text":"This is a sample text","from":"+17271112222","to":"+18132223333"}}

The agency service 115 may transmit a response to indicate the message has been stored and/or if receipt failed. The messaging module 215 may attempt to resend failed messages.

Example Agency Service Response:

ok {"response":{"status":200,"message":"ok","logged":1}} failed saving to db {"response":{"status":200,"error":8,"logged":"failed"}}

In one embodiment identified messages and/or drafts are sent and any responses received though a native messaging module on the device, which the messaging module 215 of the wiretap module 147 monitors and interfaces with to monitor and send/receive wiretapped communications. For example, in the case of the native messaging application being used, the messaging module 215 monitors the phone to detect when a new text message has been sent from or received by the device. New messages can either be detected by a polling mechanism (such as check once every second) or the messaging module 215 may monitor for new message alerts as they happen from the device's built-in notifications system. Message communications forwarded to the agency service 115 and any responses received from the agency service 115 by the native messaging application are monitored such that the messaging module 215 and/or protection module 220 may suppress notifications associated with message communications with the agency service 115 and purge stored data associated with those communications. In order to identify the wiretapped messages sent to the agency service 115, the message may be appended or prepended with information identifying the communication (e.g., in a format similar to the JSON transmission) and transmitted to the virtual number associated with the informant device 101 or other location.

In another embodiment the identified messages are sent and received using a custom messaging module that runs on the informant device 101 and appears to be the native messaging application but interfaces with the messaging module 215 to pass messages. In some cases, the informant device 101 may be customized to remove the native Messaging application and replace it entirely with the custom application mimicking the native functionality and/or appearance of the native messaging application.

As the JSON transmission method requires a data connection to transmit copies of message content to the agency service 115, in instances where a data connection is not available, the messaging module 215 may send a copy of the message to the agency service 115 via the native messaging application as describe above. In turn, the protection module 220 and/or messaging module 215 may remove the message sent to the agency service 115 from the device history.

The messaging module 215 may further monitor the informant device 101 for photos or videos captured or received at the informant device. For example, the messaging module 215 may poll a front or rear camera of the informant device 101 to collect image data showing what is going on around the informant. In turn, the messaging module 215 may transmit the collected image data via an MMS or over a data connection to the agency service 115. Further, photos taken by the informant utilizing the device may also be of interest and, similar to the above, may be formatted in an MMS or transmitted over a data connection to the agency service. The protection module 220 and/or messaging module 215 may suppress indication of the data being collected and purge the data and message sent to the agency service 115 from the device.

The protection module 220 reads the phone configuration settings and ensures that functions of the other modules of the wiretap module 147 and itself are not visible to the user on the informant device 101. For example, the protection module 220 may perform clean-up operations for the other modules should they need to temporarily store or transmit data. For example, when the messaging module 215 transmits collected SMS, MMS, image, audio recording, or email data via a designated method to the agency service 115, the protection module 220 cleans the history and any copy on the device that may alert a user to the function of the wiretap module 147.

In a specific example, any indications such as sounds or input history of the connection module 205 may be hidden or suppressed by the protection module 220 to prevent the user from recognizing that the virtual number was dialed instead of the subject or that the subject device 105 information was provided over the virtual number for establishing the connection or via other means. In another example, the protection module 220 may modify a call log to show the subject number was dialed when the virtual number was dialed instead. Call log information such as duration of the call associated with the virtual number may be filled for the recipient number. Further, any indication that subject device information was transmitted to the agency service 115 via SMS or other means may be purged from the informant device 101.

In another specific example, the protection module 220 may modify the informant device's 101 status bar to hide the GPS/location indicator that may appear automatically when the GPS location information is collected.

Additionally, in embodiments where the connection module 205 waits for a response from the agency service 115 prior to initiating the connection to the virtual number, the protection module 220 may display the default dialing image along with the subject device 105 information as would normally be display to simply make an observer believe that the phone is taking a few seconds longer to begin the connection process.

Virtual Number Provisioning

Figure 3A:
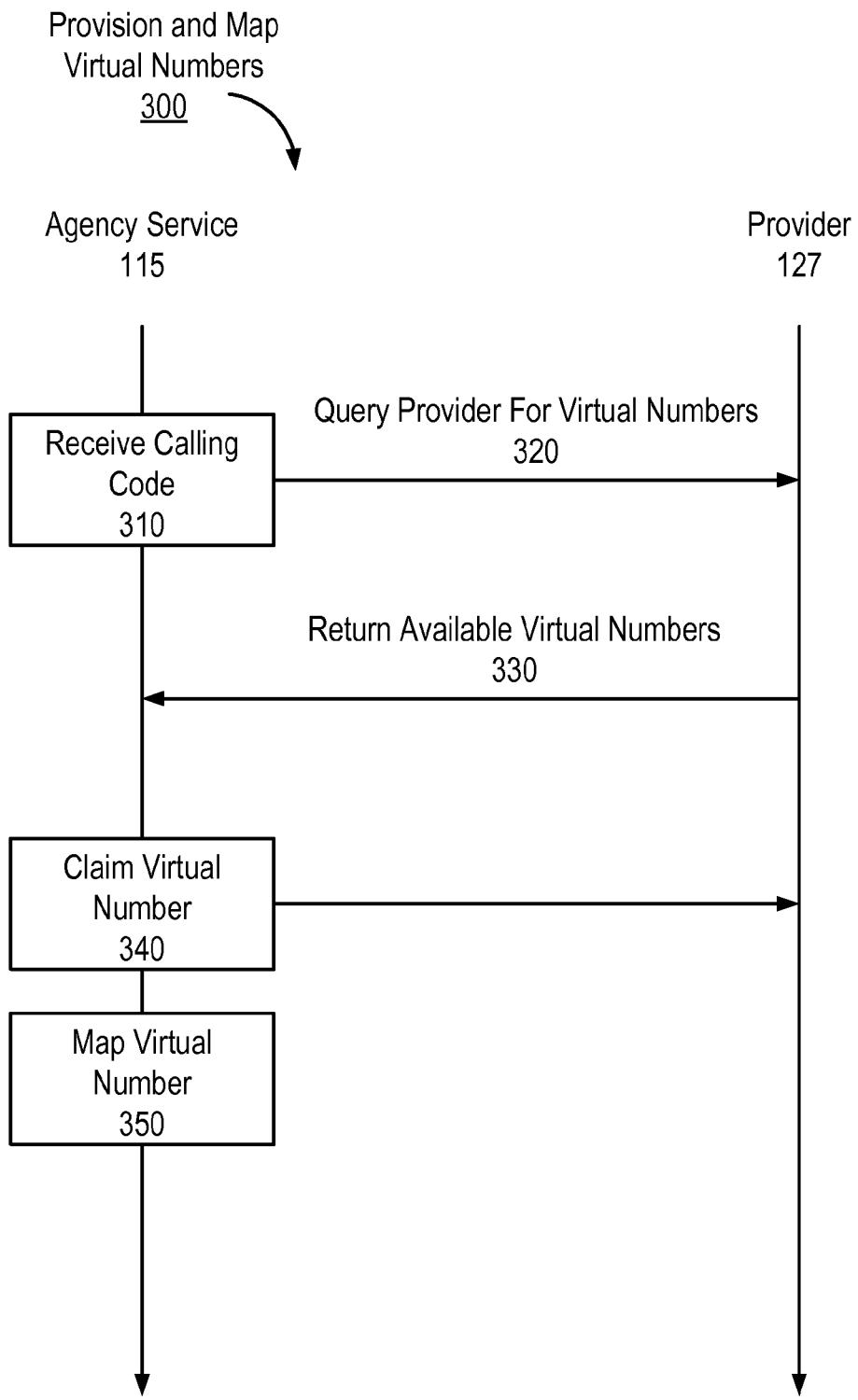
FIG. 3A is an interaction diagram illustrating a method for provisioning and mapping virtual numbers for operating an informant device with a wiretap module using a virtual number, according to one example embodiment.

FIG. 3A is an interaction diagram illustrating a method for provisioning and mapping virtual numbers for operating an informant device with a wiretap module using a virtual number, according to one example embodiment. Initially, the agency service 115 receives 310 a request including a calling code for provisioning 300 a virtual number from a wiretapping module 147, monitoring device 107, provided web interface or other entity. The calling code can include an area code and country code where the provisioned virtual number will be operated. For example, when the wiretap module 147 transmits informant device 101 information when requesting to register the informant device 101 for wiretapping at the agency service 115, the agency service may utilize the informant device 101 information to provision a virtual number with a same or nearby area code, with the same service carrier/provider used by the information device if available, etc. for use by the wiretapping module 147.

The agency service 115 queries 320 the provider for virtual numbers matching the specified calling code. The provider 127 returns 330 a list of available virtual numbers to the agency service 115 which, in turn, claims 340 a virtual number from the provider 127.

With a virtual number claimed, the agency service 115 can receive mapping requests for the virtual number and, in turn, map 350 the virtual number responsive to information in the mapping request. For example, the transmitting number of an informant device 101 identified from received informant device information during registration with the wiretap service may be stored in association with the virtual number along with an indication whether calls to/from subject devices 105 connecting to the virtual number should be wiretapped. The agency service 115 stores the transmitting number of the informant device 101 and the virtual number in a mapping table (e.g., at the agency service 115 or on the appliance 150). The mapping may be modified at any time, without any interruption of service at the receiving number.

The agency service 115 may optionally include modified number information for a claimed virtual number. For example, the agency service 115 may optionally include number information such as ANI, IMEI and caller identification information for a virtual number. In one embodiment, the agency service 115 receives all or a portion of this information from the informant device 101 when the wiretap module 147 registers with the agency service 115 based on the transmitting number of the informant device 101 mapped to the virtual number (and which the virtual number may use to spoof outgoing calls to a subject device 105).

Additionally, the agency service 115 may optionally include a ring tone specified for playback when the virtual number is dialed. The number information may be edited on the monitoring device 107 or in the web interface, or in response to requests by the wiretap module 147. The agency service 115 subsequently stores the modified virtual number information and instructs the provider 127 to update the associated virtual number information to configure the virtual number for use with the informant device 101.

Monitoring devices 107 may also be mapped to a virtual number to receive notifications and as authorization for monitoring communications between the informant device 101 and the subject device 105. Example embodiments of monitoring device 107 mapping to a virtual number can be performed in the same or similar fashion as informant device 101 mapping requests for a claimed virtual number. Monitoring device 107 mapping to Virtual number and/or virtual numbers may be used to authorize monitoring devices to listen in on call audio between an informant device 101 and subject device 105. Additionally, the mapping may be used to automatically notify a specified monitoring device 107 when the corresponding virtual number is used for communications or when other communications or data (e.g., wiretapped messages) associated with the transmitting number of the informant device 101 mapped to the virtual number are received at the agency service 115 (e.g., over a data connection).

FIG. 3B is a table illustrating an example embodiment of virtual number mapping 350 for operating an informant device 101 with virtual numbers for wiretapping. As shown, mapping table 360A includes a number of virtual numbers 363A mapped to a corresponding transmitting number 361A (e.g., of informant device 101). Also shown is a "call record" mapping indicating whether wiretappings should be generated for calls to/from a subject on the virtual number. The agency service 115 may transmit this indication to the wiretap module 147 of the corresponding informant device 101 to control wiretapping operations of the wiretap module 147 performed on the informant device 101. For example, the agency service 115 may transmit the call record indication to the wiretap module 147 for instructing whether or not communications at the informant device 101 should be routed through the virtual number and/or transmitted to the agency service 115.

When the agency service 115 receives connection requests to virtual numbers 363A from the network 120, the agency service identifies the connecting device as the informant device 101 based on the transmitting number 361A stored in the mapping table 360A. In turn, the agency service 115 or provider 127 receives a subject number from the informant device 101 and dials the corresponding subject 105 from the Virtual number 363A. The call record mapping indicates whether the communications associated with the connection request should be recorded. If the connecting device's number does not match the transmitting number 361A, the agency service 115 identifies the device as a subject device 105 and checks the table to determine whether to initiate the wiretap recording. If no wiretap record should be generated, the agency service 115 dials or instructs the provider 127 to dial the specified transmitting number for the operating device 101 without recording call audio.

In some embodiments, the mapping table 360A further includes mappings of monitoring device 107 transmitting numbers to explicitly identify authorized monitoring devices.

FIG. 3C is a table illustrating an example embodiment of virtual number mapping 350 for automatically notifying a monitoring device 107. As shown, mapping table 360B which includes a number of virtual numbers 363B mapped to a corresponding monitoring number 367 (e.g., of monitoring device 107).

When the agency service 115 receives connection requests to virtual numbers 363A from the network 120, the agency service may identify the connecting device as a subject device 105 or informant device 101 using, for example, mapping table 360A. In turn, based on the mapping of monitoring devices 107 to virtual numbers 363B (e.g., one that are also mapped 363A to an informant device 101 as shown or dedicated monitoring ones further mapped (not shown) to a virtual number 363A associated with an informant device) the agency service 115 identifies monitoring devices 107 authorized to monitor communications between the informant and subject. Thus for example, when the informant device 101 and subject device 105 communicate through a virtual number 363A, the agency service 115 may automatically identify one or more authorized monitoring device from mapping table 360B for dialing out to, from the virtual number 363C, to monitor audio communications in real time. The agency service 115, in turn, may automatically instruct the provider 127 to dial out to the identified monitoring numbers 367 from the virtual number 363B such that the monitoring devices 107 may receive call audio.

In the embodiment shown in FIG. 3C, the agency service 115 may instruct the provider 127 to dial out from the virtual number 363B or otherwise connect the monitoring device 107 with the virtual number 363B. When the virtual number 363B for monitoring audio matches that of the virtual number 363A used by the informant 101 and subject device 105, audio transmitted from the monitoring device 107 or associated with connection process (e.g., any dial tones) to the virtual number may be disabled to prevent indication that the communications between the subject and informant are being monitored. Additionally, when other wiretapped communications associated with an informant device 101 are received by the agency service 115, such as via an SMS or MMS at the virtual number or data connection from the informant device 101, the received communications and/or notification thereof may be transmitted to and/or viewed by authorized monitoring devices 107 identified from the mapping table 360B.

Incoming Wiretapping

Figure 4:
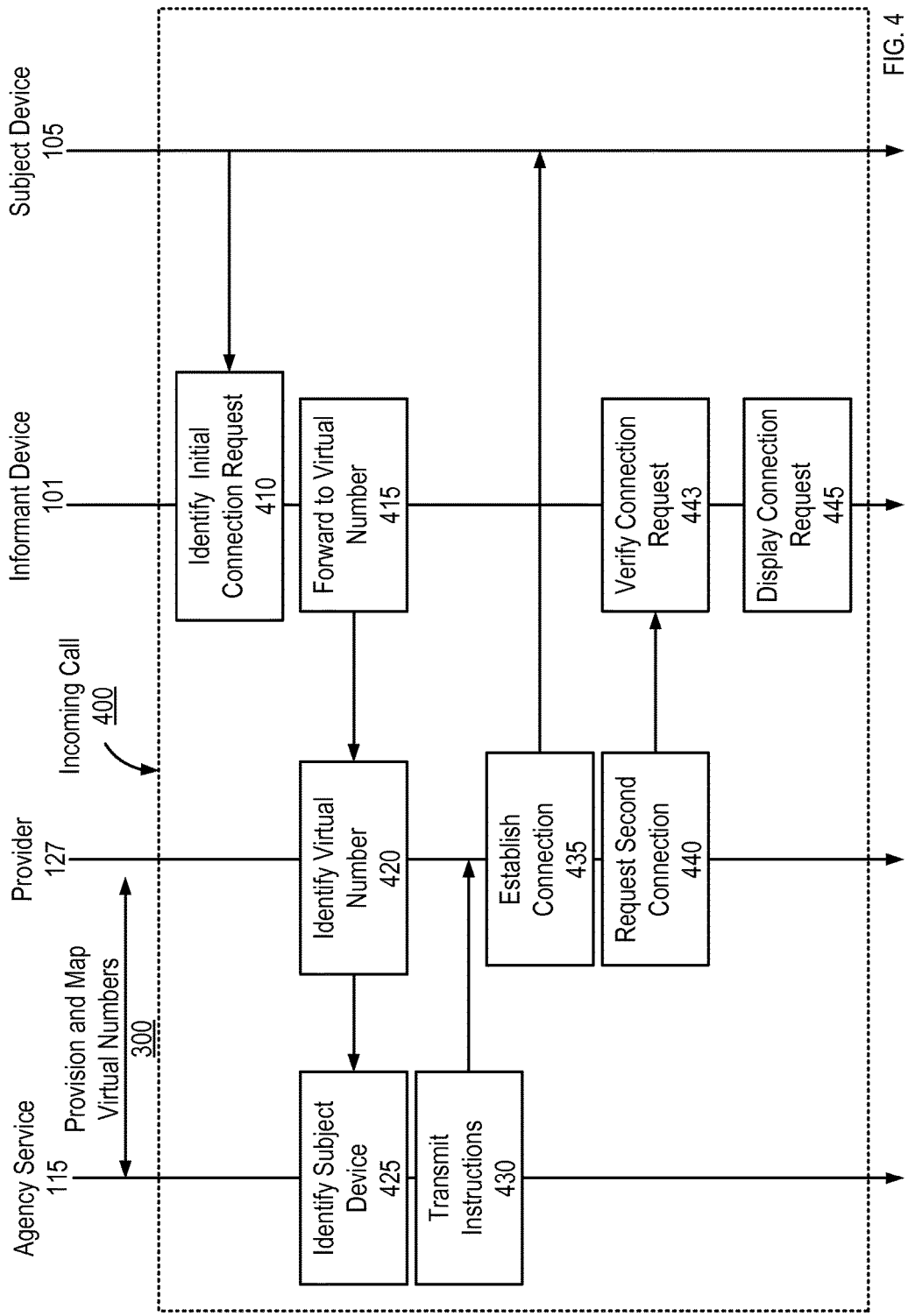
FIG. 4 is an interaction diagram illustrating a method for wiretapping an incoming call to the informant device from a subject device according to one example embodiment.

FIG. 4 is an interaction diagram illustrating a method for wiretapping an incoming call 400 to the informant device 101 from a subject device 105 according to one example embodiment. Once the agency service 115 provisions 300 a virtual number with the provider 127, wiretap recordings may be generated using a registered informant device 101 associated with the virtual number.

For an incoming call 400, the informant device 101 identifies 410 an initial connection request from a subject device 105 and conditionally call forwards 415 the initial connection request of the subject device 105 to a virtual number associated with the informant device 101. For example, the virtual number may be specified in a conditional call forwarding command (e.g., **67*[Virtual Number]#) provided by a wiretap module 147 on the informant device 101 prior to receiving the initial connection request 410 for wiretapping. In one embodiment, a wiretap module 147 on the informant device 101 identifies the initial received connection request 410 and rejects the connection request to conditionally forward 415 the request. The wiretap module 147 may identify and reject the initial received connection request 410 based on the number information (e.g., of the subject device 105) for the incoming request not matching that of the virtual number registered with the informant device 101. Additionally, the wiretap module 147 may store the number information associated with the initial connection request 410 from the subject device 105. The wiretap module 147 may further suppress any indication that the initial connection request 410 was received at the informant device 101 and call forwarded to the virtual number.

The provider 127 identifies 420 that a device (i.e., the subject device 105) is requesting to communicate with a virtual number provisioned by the agency service 115 by way of the initial connection request being forwarded 415 to the virtual number. The provider 127 passes the number information (i.e., for the subject device) associated with the connection request to the virtual number along with the identified virtual number 420 to the agency service 115.

A mapping table at the agency service 115 stores virtual numbers in association with informant device information. Using the mapping table, the agency service 115 identifies that the number information (i.e., for the subject device) associated with the connection request to the virtual number does not match the number information of the informant device 101 stored in association with the virtual number in the mapping table. Hence, the agency service 115 identifies 425 the device requesting to connect to the virtual number as a subject device 105 having been forwarded to the virtual number. The mapping table at the agency service 115 may also indicate whether communications through the virtual number should be wiretapped. Communications flagged for wiretapping may be recorded and/or monitored in real-time. If the communications are to be wiretapped, the agency service 115 transmits 430 instructions to the provider 127 for configuring the wiretapped communications session through the virtual number including generating a recording of the audio communications between the informant device 101 and the subject device 105. If the communications are not to be wiretapped, the agency service 115 may still instruct the provider 127 to configure a communications session through the virtual number but not to generate any associated recording.

The provider 127, in turn, establishes a connection 435 with the subject device 105 through the virtual number and a plays a ringtone on the virtual number to the subject device 105 such that the subject believes the original connection request 410 to the informant device is still in process based on the instructions 530 received from the agency service 115. The provider 127 also initiates a second connection request 440 to the informant device 101 from the virtual number based on the instructions 530 received from the agency service 115. Audio associated with establishing the section connection request 440 may be suppressed by the provider 127 such that the subject device 105 receives only audio for the specified ring stone. In turn, when the informant device 101 accepts the connection request, the provider 127 ceases playback of the ringtone on the virtual number and enables the subject device 105 to receive audio communications from the informant device 101 and vice versa.

The informant device 101 receives the connection request 440 and verifies 443 the second connection request as being associated with the initial received 410 connection request. In one embodiment, the wiretap module 147 on the informant device 101 may verify 443 that the second connection request 440 is associated with the initial connection request 410 based on their temporal proximity. For example, the wiretap module 147 may verify the second connection request 440 and initial connection request 410 are associated if the second connection request 440 is received within 1-15 seconds of the initial connection request 410.

The wiretap module 147 may also verify 443 the second connection request 440 and the initial connection request 410 are associated based on number information (e.g., a transmitting number) associated with the connection request 440 through the virtual number. In one example embodiment, the number information for the second connection request 440 is configured to match that of number information stored for the virtual number registered with the informant device 101. Accordingly, the wiretap module 147 verifies 443 the second connection request 440 and the initial connection request 410 are associated based on a match of the number information for the second connection request 440 matching stored number information for the virtual number registered to the informant device 101. In another example embodiment, the number information for the second connection request 440 is configured to match that of the number information for the subject device 105 identified by way of the initial connection request 410 forwarded to the virtual number. Accordingly, the wiretap module 147 verifies 443 the second connection request 440 and the initial connection request 410 are associated based on a match of the number information for the second connection request 440 matching stored number information for the subject device 105 from the initial received connection request 410.

If the second connection request 440 is not verified, the connection request may be identified as an initial connection request (e.g., from another subject device 105) and processed starting from block 410 as described above.

If the second connection request 440 is verified 443, the connection request is displayed 445 for the informant to act upon. In some embodiments, the wiretap module 147 modifies the number information for the displayed 445 connection request such that the displayed connection request appears to originate from the subject device 105. For example, if the number information for the second connection request 440 matches that of the virtual number registered to the informant device 101, the wiretap module 147 modifies the number information for the displayed 445 connection request to match the number information for the subject device stored from the initial connection request 410. The wiretap module 147 may further modify call logs on the informant device 101 such that the second connection request 440 appears to originate from the subject device 105.

If the informant answers, the provider 127 connects the informant device 101 and the subject device 105 through the virtual number. For wiretapped communications, the provider 127 additionally record audio on the virtual number between the subject device 105 and the informant device 101 and transmits the audio from the wiretapping to the agency service 115.

Outgoing Wiretapping

FIG. 5 is an interaction diagram illustrating a method for wiretapping an outgoing call 500 from the informant device 101 to a subject device 105 according to one example embodiment. Once the agency service 115 provisions 300 a virtual number with the provider 127, wiretap recordings may be generated using a registered informant device 101 associated with the virtual number.

For an outgoing call 500, the informant provides subject device 105 number information by entering or selecting the transmitting number of the subject device 105 or selecting a contact populated with subject device 105 number information in an address book on the informant device 101. In turn, when the informant device 101 attempts to initiate a connection request to the subject device 105, a wiretapping module 147 executing on the informant device detects the attempt and collects the provided number information for the subject device for transmission 510 to the agency service 115 and does not initiate or terminates the connection request to the subject device 105. Instead, to establish a connection with the subject device 105, the wiretap module 147 causes the informant device 101 to initiate a connection request 515 with the virtual number. For example, the wiretap module 147 may provide stored number information for the virtual number registered with the informant device 101 to a native dialer on the informant device and cause the native dialer to initiate a call to the virtual number instead of the subject device. In other words, the wiretap module 147 replaces the connection request to the subject device 105 with the connection request 515 to the virtual number.

In some embodiments, the wiretap module 147 causes the informant device 101 to transmit 510 the collected number information for the subject device to the agency service 115 and waits for an acknowledgement from the agency service 115 as to the validity of the number information for the subject device prior to requesting 515 the connection with the virtual number. The wiretap module 147 may suppress indication that the attempt to initiate a connection with the subject device was not performed and the connection request was initiated 515 with the virtual number instead. For example, the wiretap module 147 may cause the informant device 101 to display (or continue to display) information for the subject device instead of the number information for the virtual number provided to the native dialer. Thus, the informant or other user of the informant device 101 may be unaware of the communications being routed through the virtual number.

The provider 127 identifies 520 that a device (i.e., the informant device 101) is requesting to communicate with a virtual number provisioned by the agency service 115. The provider 127 passes the number information (i.e., for the informant device) associated with the connection request to the virtual number along with the identified virtual number 520 to the agency service 115. A mapping table at the agency service 115 stores virtual numbers in association with informant device information. Using the mapping table, the agency service 115 identifies that the number information (i.e., for the informant device) associated with the connection request to the virtual number matches the number information of the informant device 101 stored in association with the virtual number in the mapping table. Hence, the agency service 115 identifies 525 the device requesting to connect to the virtual number as the informant device 101 attempting to communicate with a subject device 105.

The mapping table at the agency service 115 may also indicate whether communications through the virtual number should be wiretapped. Communications flagged for wiretapping may be recorded and/or monitored in real-time. If the communications are to be wiretapped, the agency service 115 transmits 530 instructions to the provider 127 for configuring the wiretapped communications session through the virtual number including generating a recording of the audio communications between the informant device 101 and the subject device 105. If the communications are not to be wiretapped, the agency service 115 may still instruct the provider 127 to configure a communications session through the virtual number but not to generate any associated recording.

In some embodiments, the agency service 115 receives information 510 about the subject device 105 the informant device 101 is attempting to communicate with from the informant device 101 prior to, or proximate to, the informant device 101 requesting to communicate with the virtual number. For example, a wiretap module 147 on the informant device 101 may transmit 510 the number information about the subject device 105. The agency service 115, in turn, may transmit an acknowledgement to the informant device 101 indicating that the number information for the subject device has been verified and the virtual number is available to the informant device 101 to communicate with the subject device 105. In instances where the agency service 115 receives the number information for the subject device 105 from informant device 101, the agency service 115 transmits 530 instructions to the provider 127 including the number information for the subject device 105 the informant device is attempting to communicate with through the virtual number. The agency service 115 may additionally transmit 530 instructions to the provider 127 for configuring the number information of the virtual number (e.g., spoofing the number information) to match the number information of the informant device.

The provider 127, in turn, establishes 535 a connection with the informant device 101 and initiates a connection request 540 to the subject device 105 (specified by the agency service 115) with the virtual number. In some embodiments, the agency service 1115 instructs the provider 127 to receive number information for the subject device 105 the informant device 101 is attempting to communicate with via the virtual number. For example, the agency service 115 may instruct the provider 127 establish 535 a connection with the informant device 101 through the virtual number to receive a transmitting number of the subject device 101 provided by the informant device via dial tones when the connection is established. For example, in one embodiment, the wiretap module 147 may detect when the connection with the virtual number is established 535 and provide the transmitting number for the subject device 105 via dial tones through the native dialer. The wiretap module 147 may suppress visual and audible indication on the informant device 101 that dial tones were provided for the transmitting number of the subject device. In turn, the provider 127 initiates a connection request 540 to the subject device 105 (specified by the informant device 101) with the virtual number.

In either instance, as the number information for the virtual number is spoofed with the number information of the informant device 101, the connection request 540 to the subject device 105 appears as if it originated from the informant device 101. Accordingly, the subject device 105 displays 545 the connection request to the subject to act upon. If the subject answers, the provider 127 records audio on the virtual number and transmits the audio from the wiretapping to the agency service 115.

In some embodiments, the agency service 115 may utilize a mapping table to identify one or more monitoring device 107 authorized to monitor communications (e.g., inbound 400 and/or outbound 500) on a virtual number assigned to the informant device 101. If the communications associated with the informant device 101 are flagged for wiretapping, the agency service 115 may notify a monitoring device 107 and/or authorize the monitoring device 107 to monitor the communications in real time. In one embodiment, the agency service 115 instructs the provider 127 to notify a monitoring device 107 by initiating a connection request to the monitoring device with the virtual number utilized by the informant device and/or subject device or a monitoring number associated with the virtual number in the mapping table. In either instance, the agency service 115 additionally instructs the provider 127 to disable audio associated with the connection to the monitoring device 107 such that the informant and/or subject are not aware that their communications are being monitored in real time.

SUMMARY

Additional configurations of embodiments of a wiretap module may be used in a non-covert fashion. In an example case, the wiretap module may present the user of the informant device with the wiretap module additional options when placing an outbound call. Unlike above where an outbound call to a subject device is automatically routed through the virtual number without the informant's knowledge, the wiretap module may be configured to provide the informant with options for configuring how the connection request from the virtual number places to the subject device appears. Specifically, referring to FIG. 5, the subject information may include a desired configuration for the virtual number supplied by the informant device. Accordingly, the connection module 205 may query the user of the informant device 101 to select a configuration for the virtual number. A default configuration may cause the agency service 115 to instruct the provider 127 to request a connection 540 with the subject device through the virtual number using the virtual number information stored in the mapping table (e.g., how the virtual number was provisioned). One alternative configuration may enable the informant to specify number information which the agency service 115 then instructs the provider 127 to use for the virtual number. For example, the informant may select their own or other device information such that the connection request 540 appears to come from the informant device or another given device. In one embodiment, the number information for the virtual number may be transmitted to the agency service 115 by the connection module 225 within the outbound request.

The foregoing description of the embodiments has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A computer based method for wiretapping telephonic communications through a virtual number, the method comprising:
   receiving information in response to a request from a telephonic device to communicate with the virtual number, the virtual number associated with an informant device and the information including number information corresponding to the telephonic device and the virtual number;
   identifying the telephonic device as the informant device based on a comparison of the received number information corresponding to the telephonic device with number information for the informant device stored in association with the virtual number in a mapping table; and
   in response to identifying the telephonic device as the informant device, transmitting instructions for:
      connecting the informant device with a subject device through the virtual number;
      identifying, to the subject device, the number information for the informant device; and
      generating a recording of the communications between the informant device and the subject device through the virtual number.

2. The method of claim 1, wherein number information includes a transmitting number of a telephonic device.

3. The method of claim 1, further comprising receiving number information for the subject device from the informant device.

4. The method of claim 3, further comprising transmitting an acknowledgement to the informant device, the acknowledgement indicating a status of the virtual number for wiretapping telephonic communications between the informant device and the subject device.

5. The method of claim 3, wherein the instructions for connecting the informant device with the subject device through the virtual number comprise the number information for the subject device received from the informant device.

6. The method of claim 3, wherein the instructions for connecting the informant device with the subject device through the virtual number further comprise instructions for:
   connecting the informant device with the virtual number;
   receiving, through the virtual number, number information for the subject device from the informant device; and
   connecting the informant device with the subject device through the virtual number based on the number information received for the subject device.

7. The method of claim 1, further comprising:
   receiving, from the informant device, a registration request for wiretapping communications of the informant device, the registration request including the number information for the informant device;
   provisioning the virtual number in response to the registration request;
   storing the virtual number in the mapping table in association with the transmitting number corresponding to the informant device; and
   transmitting the virtual number to the informant device.

8. The method of claim 7, further comprising storing an identifier in association with the virtual number indicating whether communications through the virtual number should be recorded.

9. A computer based method for establishing incoming communications to an informant device through a virtual number, the method comprising:
   storing virtual number information for the virtual number registered to the informant device for wiretapping communications of the informant device;
   configuring a command to conditionally forward received connection requests to the virtual number;
   receiving a first connection request having first number information;
   identifying the first connection request as an initial connection request from a subject device based on a comparison of the first number information with the virtual number information;
   in response to identifying the first connection request as the initial connection request from the subject device:
      transmitting the command for conditionally forwarding the initial connection request to the virtual number; and
      suppressing an indication of receipt of the first connection request;
   receiving a second connection request having second number information;
   verifying the second connection request is associated with the initial connection request from the subject device based in part on a temporal proximity of receipt of the initial connection request and receipt of the second connection request; and
   displaying the second connection request at the informant device.

10. The method of claim 9, wherein configuring the command to conditionally forward received connection requests to the virtual number comprises transmitting a request including the virtual number information to enable conditional call forwarding to the virtual number.

11. The method of claim 10, wherein the command is a call reject command.

12. The method of claim 9, further comprising:
   storing the first number information; and
   displaying the second connection request with number information matching the first number information.

13. The method of claim 9, wherein displaying the second connection request comprises modifying display of the second connection request to match a display of the first connection request.

14. The method of claim 13, wherein suppressing an indication of receipt of the first connection request comprises suppressing the display of the first connection request.

15. The method of claim 9, wherein suppressing an indication of receipt of the first connection request comprises suppressing display of the first connection request on the informant device.

16. The method of claim 9, wherein suppressing an indication of receipt of the first connection request comprises modifying a call log of the informant device.

17. The method of claim 9, further comprising, in response verifying the second connection request is associated with the initial connection request, modifying a call log of the informant device associated with the second connection request with the first number information.

18. The method of claim 9, wherein verifying the second connection request is associated with the initial connection request from the subject device further comprises one of:

verifying the second number information matches the stored virtual number information; and verifying the second number information matches the first number information.

19. The method of claim 9, wherein verifying the second connection request is associated with the initial connection request from the subject device based in part on the temporal proximity of receipt of the initial connection request comprises verifying receipt of the second connection request within a time frame not exceeding 15 seconds from receipt of the initial connection request.

20. A wiretapping system comprising:
an informant device, the informant device comprising:
  a processor;
  a non-transitory computer readable medium storing computer readable instructions that when executed cause the processor to:
    store virtual number information for a virtual number registered to the informant device for wiretapping communications of the informant device;
    detect a request to communicate with a subject device;
    transmit number information for the subject device; and
    replace the request to communicate with the subject device with a request to communicate with the virtual number; and
a wiretapping server, the wiretapping server comprising:
  a processor;
  a non-transitory computer readable medium storing computer readable instructions that when executed cause the processor to:
    receive the number information for the subject device from the informant device;
    receiving information in response to a request from a telephonic device to communicate with the virtual number, the information including number information corresponding to the telephonic device and the virtual number;
    identifying the telephonic device as the informant device based on a comparison of the received number information corresponding to the telephonic device with number information for the informant device stored in association with the virtual number in a mapping table; and
    in response to identifying the telephonic device as the informant device, transmitting instructions for:
      connecting the informant device with the subject device through the virtual number based on the received number information for the subject device;
      identifying, to the subject device, the number information for the informant device; and
      generating a recording of the communications between the informant device and the subject device through the virtual number.

* * * * *